K. E. BUNNELL & A. R. BROWN.
Milk-Coolers.
No. 151,751. Patented June 9, 1874.
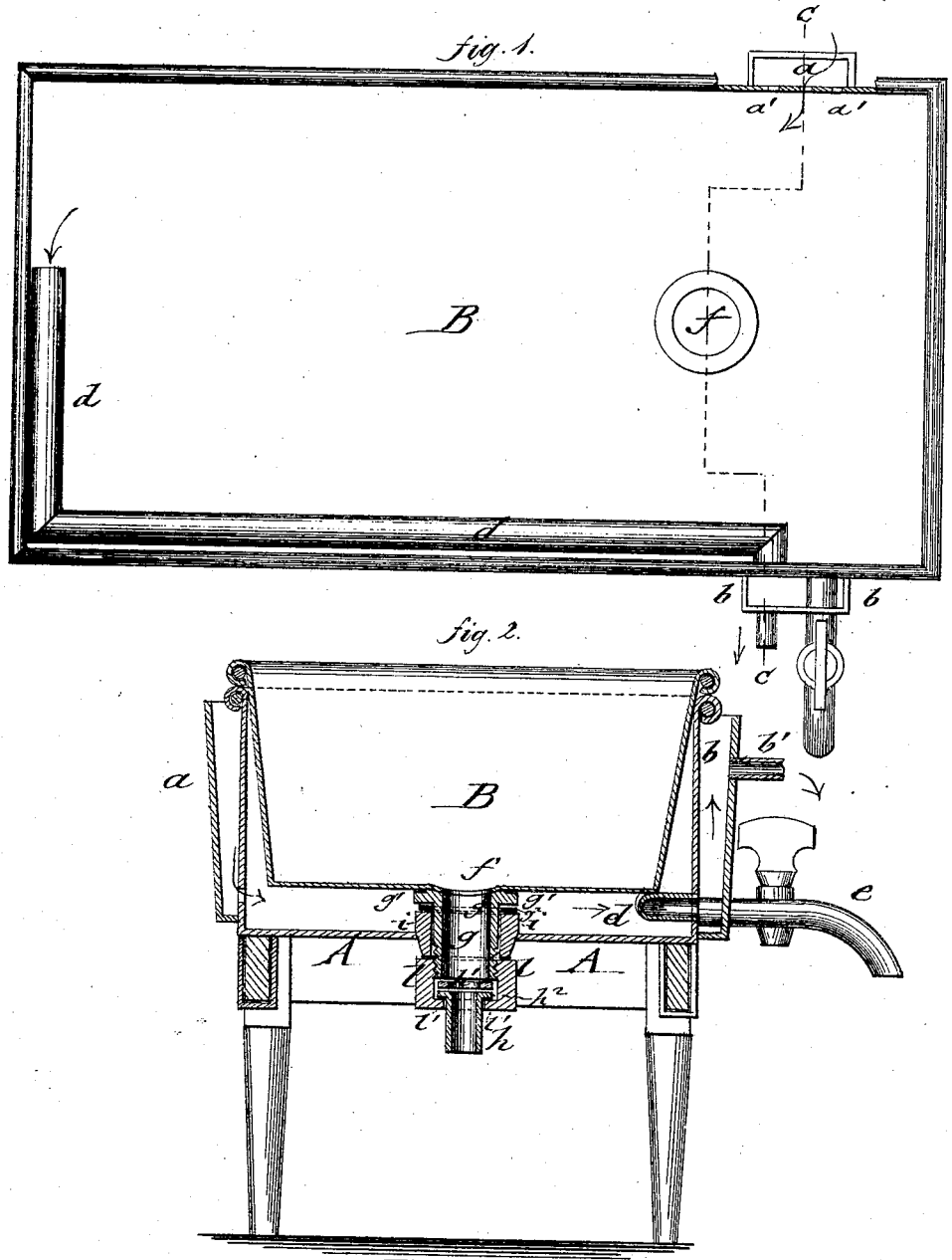

UNITED STATES PATENT OFFICE.

KOSSUTH E. BUNNELL AND ALBERT R. BROWN, OF GUILFORD, NEW YORK.

IMPROVEMENT IN MILK-COOLERS.

Specification forming part of Letters Patent No. 151,751, dated June 9, 1874; application filed May 1, 1874.

*To all whom it may concern:*

Be it known that we, KOSSUTH E. BUNNELL and ALBERT R. BROWN, of Guilford, Chenango county, New York, have invented a new and Improved Milk-Cooler, of which the following is a specification:

In the accompanying drawing, Figure 1 represents a top view of our improved milk-cooler; Fig. 2, a vertical transverse section of the same on line $c\ c$, Fig. 1; Fig. 3, a detail view of clamp-fastening of milk-can and water-tank.

Similar letters of reference indicate corresponding parts.

The object of our invention is to furnish to farmers and dairymen an improved milk-cooler, by which the milk is rapidly cooled, being surrounded at the bottom and sides by cold water, and readily drawn off without leakage.

The invention will first be fully described, and then pointed out in claim.

The milk is drawn off by a water-tight pipe-joint passing from the bottom of the milk-pan through the bottom of the water-tank to the outside. The milk-pan and cooling-tank are fastened by clamps, attached to the top rims of the same, for preventing the lifting off of the pan from the tank by the water.

In the drawing, A represents the cooling vessel or tank, which is supported in suitable manner, and supplied with cold water from the well or spring by a funnel-shaped side casing or entrance-tube, $a$, having perforations $a'$ near the bottom of the tank. A similar casing or exit-tube, $b$, is applied to the tank opposite to entrance-tube $a$, and provided with a waste-pipe, $b'$, at suitable height. The water gradually covers the bottom of the tank, and communicates by an inclined tube, $d$, which is open at both ends, and passes along the sides of the tank with the exit-pipe $b$, conducting it up to the waste-pipe $b'$, so as to fill thereby the space around the sides of the tapering milk-pan B up to the height of the waste-pipe, and expose the milk therein at the bottom and side to the cooling action of the water. A faucet, $e$, is applied to the tank near the bottom, passing, preferably, through the lower part of exit-casing $b$, and serves to draw off all the water, for the purpose of cleaning or repairing the tank. For the purpose of drawing off the milk from the bottom of the pan B, the same is provided with an aperture, $f$, around which the bottom is slightly inclined or concaved. Aperture $f$ connects by a downward-extending pipe, $g$, through an aperture of the bottom of the water-tank, with a coupling pipe-joint, $h$. The aperture of the water-tank is provided with a projecting collar, $i$, which forms the seat for the shoulder $g^1$ of tube $g$, and the coupling $l$ of pipe-joint $h$, while it prevents, also, any water that may remain in the bottom of the tank from running out on the floor after the pan is taken off. A packing-ring, $g^2$, is interposed between the shoulder $g^1$ and collar $i$, for forming the water-tight connection of the same, a second packing-ring, $h^1$, being placed between the lower end of the connecting-tube $g$ and top part of joint $h$. The pipe-joint $h$ rests by a shoulder, $h^2$, on a collar, $l'$, of threaded sleeve $l$, which screws over the end of tube $g$, and couples thereby the outlet-pipe $h$ firmly to the collar $i$ and tube $g$.

The water-tight joint of the different parts admits of the passing out of the milk when the rubber or cork stopper closing the aperture of the pan is removed without the leakage of water or milk.

The milk-pan rests by its projecting rim on the top rim of the water-tank, and is firmly fastened thereto by clamps $m$, (shown in Fig. 3,) which are slipped by their curved and straight ends over the rims, for preventing the lifting of the milk-pan by the water in the tank.

A very simple and effective milk-cooler is thus obtained, the parts of which are readily detached for cleaning, and tightly connected for use without delay.

Having thus described our invention, we claim as new and desire to secure by Letters Patent—

The combination with milk-pan B, having aperture $f$, and a correspondingly-apertured surrounding water-tank, A, of the flanged tubes $g\ h$, collar $i$, flanged coupling $l$, and packings $g^2\ h^1$, all constructed and arranged substantially as shown and described.

KOSSUTH E. BUNNELL.
ALBERT R. BROWN.

Witnesses:
JACOB A. HAYNES,
E. L. BRADLEY.